United States Patent [19]

Borsh et al.

[11] Patent Number: 4,578,528
[45] Date of Patent: Mar. 25, 1986

[54] ELECTRICAL OUTLET BOX AND METHOD OF MANUFACTURING SAME

[75] Inventors: Richard J. Borsh, Chagrin Falls; Robert W. Ripley, Brecksville; Harold T. Pate, Solon, all of Ohio

[73] Assignee: Thyssen-Bornemisza, Inc., (TBG Inc.), New York, N.Y.

[21] Appl. No.: 518,737

[22] Filed: Jul. 29, 1983

[51] Int. Cl.$^4$ .............................................. H02G 3/08
[52] U.S. Cl. .................................. 174/65 G; 29/432; 174/153 G
[58] Field of Search .................... 174/65 R, 65 G, 53, 174/58, 153 G; 220/3.2–3.94; 248/56; 285/162; 339/103 C, 107; 29/432

[56] References Cited

U.S. PATENT DOCUMENTS

| | | | |
|---|---|---|---|
| 982,535 | 1/1911 | Rudkiewicz | 174/65 R |
| 3,056,852 | 10/1962 | Sachs | 174/153 G |
| 3,353,701 | 11/1967 | Palmer | 220/3.5 |
| 3,873,759 | 3/1975 | Schindler et al. | 174/65 R |
| 4,302,035 | 11/1981 | Ochwat | 174/65 R |

FOREIGN PATENT DOCUMENTS 760597 11/1956 United Kingdom ............. 174/65 R

Primary Examiner—A. C. Prescott
Assistant Examiner—D. A. Tone
Attorney, Agent, or Firm—William R. Laney

[57] ABSTRACT

An electrical outlet box optionally having in combination therewith, a connector fitting for connecting a corrugated conduit to the box, the box having a back wall and at least one side wall of synthetic resin. A pressure removable plug is displaced out of the plane of the side wall so as to provide a precisely delineated zone of weakness surrounding the plug. When one preferred type of connector fitting is used in combination with the box, a wedge-shaped end portion of the fitting, having a relatively small surface area, is manually pressed against the pressure removable plug along a pressure zone immediately radially inwardly from the zone of weakness. This pops the plug out of the wall of the box, leaving a neat, smooth hole into which the connector fitting may be inserted by continued manual pressure applied thereto. The connector fitting includes an expandable cylindrical body portion, and further includes an external circumferential groove at the intersection of the cylindrical body portion with the wedge-shaped end portion. The edge of the wall which defines the opening formed on removal of the plug snaps into this groove to interlock the connector fitting in the wall of the box.

2 Claims, 7 Drawing Figures

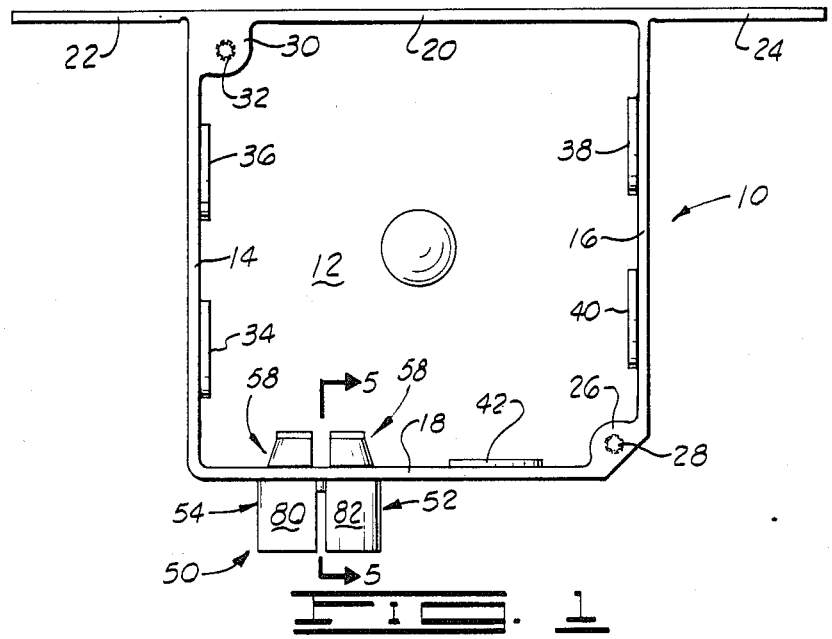
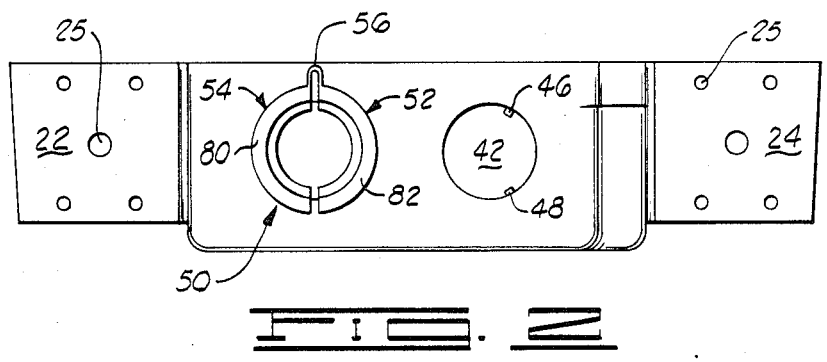
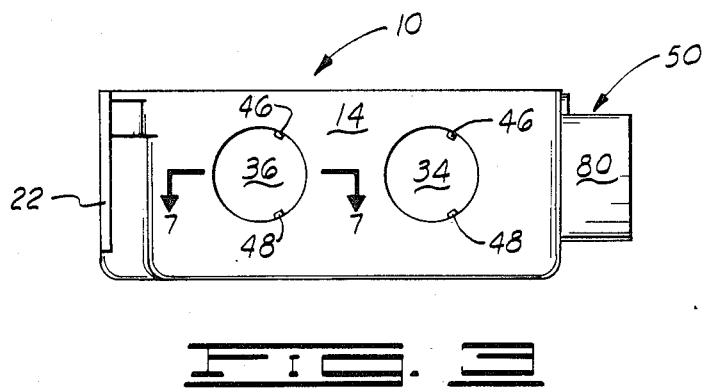

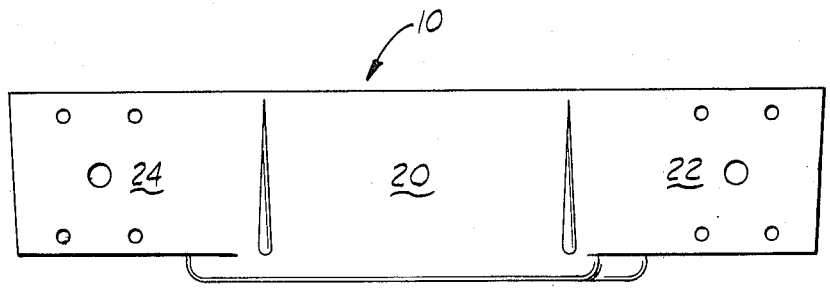
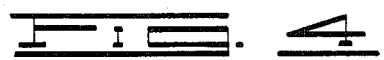
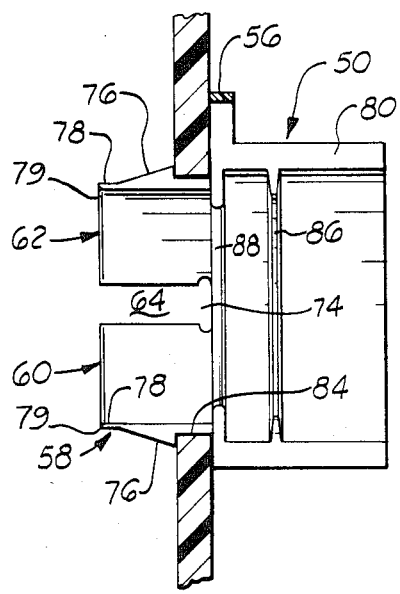
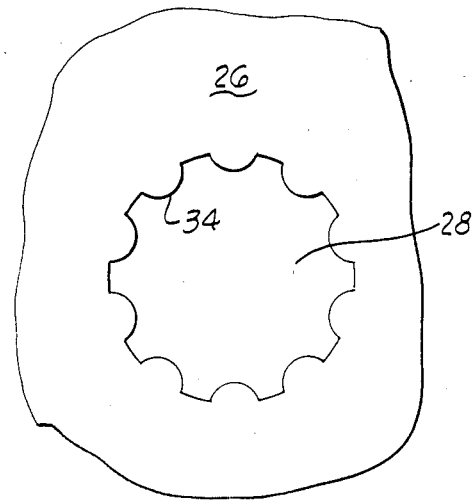
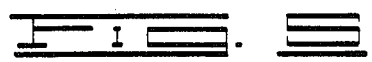
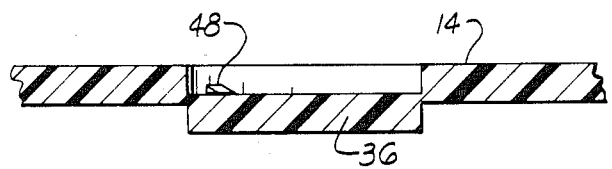
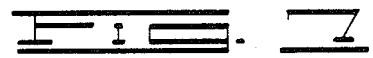

ELECTRICAL OUTLET BOX AND METHOD OF MANUFACTURING SAME

FIELD OF THE INVENTION

This invention relates to synthetic resin electrical outlet boxes, and more particularly, to synthetic resin outlet boxes which are adapted to have electrical leads extended through at least one side of the box.

BACKGROUND OF THE INVENTION

Brief Description of the Prior Art

A number of types of synthetic resin electrical outlet boxes have heretofore been marketed. A number of these are the subject of United States patents which have previously issued.

In synthetic resin electrical outlet boxes, such boxes are adapted to be secured to the material of construction of a building wall and to provide a junction and/or switching connection by which electrical service may be conducted from the box to certain appliances, lights or other electrically operated devices. Such boxes conventionally have a plurality of electrical leads extended to the box, passed through the wall or the back of the box and secured to terminals within the box. Such boxes also have a removable cover or face plate which is secured to the open front side of the box after the electrical connections have been appropriately made within the box, and prior to placing the box in service.

It is typical in the construction of such synthetic resin electrical outlet boxes to provide one or more knockout panels, windows or plugs in the walls of the box in order to make openings at the location where electrical leads or conduits are to be extended into and connected within the box. Various ways of configuring and making such knockout plugs or windows have been heretofore proposed, but generally, such plugs or windows constitute panels or discs held within the box wall at a certain location thereon by small tabs or hinges which are frangible and easily broken under pressure. One problem which has characterized such knockout panels, plugs or windows has been the rough or asymmetrical defining boundary which surrounds the opening formed when such plugs or panels are removed. This makes it difficult to use connector fittings inserted into or attached to such openings where such connector fittings are to be used to connect a hollow conduit or raceway to the box for the purpose of conveying electrical conductors thereto.

Patented examples of synthetic resin electrical outlet boxes of the type described are the boxes which are illustrated in the following U.S. and foreign patents:

| U.S. PATENTS | |
|---|---|
| 2,867,349 | Parker |
| 4,105,862 | Hoehn |
| 3,876,821 | Pringle |
| 4,248,459 | Pate el al |
| 4,315,100 | Haslbeck et al |
| 4,306,109 | Nattel |
| 4,071,159 | Robinson et al |
| 4,036,389 | Pate el al |
| 2,804,116 | Van Niel et al |
| 3,575,313 | Trachtenberg |
| Re 28,489 | Schindler et al |
| 4,215,787 | Moran et al |
| 3,895,732 | Robinson et al |
| 4,167,648 | Lockwood |
| 2,299,696 | Gregersen |
| -continued | |
| 3,863,037 | Schindler et al |
| 3,863,021 | Schindler et al |
| 3,740,451 | Schindler et al |
| 3,353,701 | Palmer |
| 4,130,335 | Kinney |
| 4,281,773 | Mengue |
| FOREIGN PATENTS | |
| Dutch Patent | 87,242 |
| British Patent | 1,204,338 |
| British Patent | 811,544 |
| West German | 1,036,974 |

GENERAL DESCRIPTION OF THE PRESENT INVENTION

The present invention provides an improved synthetic resin electrical box. One aspect of the invention also provides a novel and useful connector fitting which can be very quickly attached or connected to a side wall of the box by the removal of a pressure removable plug provided at that location. The box is sturdily constructed, and the pressure removable plug, while maintaining the integrity of the wall of the box until removed, can be easily pressed out of the box wall so as to leave a clean, symmetrical opening in the wall for receipt of electrical conductors therethrough. In one embodiment of the invention, a novel connector fitting is snap engaged with the opening in the box wall.

Broadly described, the electrical outlet box of the invention has a back wall and at least one side wall (as where the box wall is of circular configuration). In a preferred embodiment of the invention, the box includes four side walls, and is in the form of a right parallelepiped.

In one or more of the walls of the box, a pressure removable plug is displaced out of the wall so that it protrudes out of the plane of the wall from which it is pressed by an amount or distance which is from 85% to 95% of the wall thickness. Typically, although the dimension will vary with different types of plastic or synthetic resins, as well as with different wall thicknesses, the pressure removable plug remains attached to the wall by, a thin interconnecting web which is from about 5% to about 15% of the wall thickness. The pressure removable plug is formed by pressing against one side of the wall box in which the plug is to be located with a die punch which is carefully controlled so that the plug, which is a circular disc in shape, is pressed evenly and smoothly out of the plane of the wall of the box, and the punch press leaves a perfectly cylindrical cavity in the wall at the location where the plug has been pressed out. Normally, the pressure removable plug will be pressed out of the wall of the box toward the inside of the box.

A certain type of novel connector fitting, among various other known types of fittings, can be employed in especially advantageous combination with the box. This connector fitting has a wedge-shaped end portion located at one side of the fitting and has a cylindrical body portion at the other side of the fitting. The fitting is hollow, having a generally cylindrical bore extending therethrough. At the intersection of the wedgeshaped end portion of the fitting with the cylindrical body portion, an external circumferential groove is formed around the outer side of the fitting.

Where the described fitting is employed, it is engaged with the box by pressing the wedge-shaped end of the fitting, which has a relatively small surface area, against the pressure removable plug along a pressure zone which is immediately radially inwardly of a zone of weakness by which the pressure removable plug is connected to the side wall from which it is pressed. This pops the plug out of the wall of the box, leaving a neat, smooth, perfectly circular hole into which the connector fitting may be inserted by continuing to exert manual pressure on the plug. When the plug is pressed into the opening thus formed, the portion of the box which forms an edge constituting the boundary of the hole where the plug has been removed snaps into the circumferential groove around the outer side of the connecter fitting.

In a preferred form of the connector fitting, the fitting is provided with one or more internal circumferential ribs which function to engage a corrugated synthetic resin conduit or raceway which is placed within the fitting, and is used in the electrical system to carry electrical leads to the interior of the outlet box.

An important object of the present invention is to provide a synthetic resin electrical outlet box having pressure removable plugs in the walls thereof, each of which can be easily removed from its respective wall. The plug construction is such that, by a single motion, a synthetic resin connector fitting can be inserted through, and snapped into engagement with, the wall with the removal of the pressure removable plug therefrom.

Another object of the invention is to provide a method of constructing a pressure removable plug in the side wall of a synthetic resin electrical outlet box so that the plug can be removed by the application of relatively little pressure thereto and which, when removed, leaves a smoothly bounded, neat and symmetrical circular hole in the side wall of the box.

An additional object of the invention is to provide an improved connector fitting which can be snap-engaged with the wall of an electrical outlet box to provide a quick connector device for connecting a corrugated conduit to the electrical outlet box.

Another object of the invention is to provide an electrical outlet box in which pressure removable knock-out plugs are provided in side walls of the box without in any degree impairing the water tight integrity of the side walls in which such plugs are located.

Additional objects and advantages of the invention will become apparent as the following detailed description of a preferred embodiment of the invention is considered in conjunction with the accompanying drawings which illustrate such preferred embodiment.

GENERAL DESCRIPTION OF THE DRAWINGS

FIG. 1 is a top plan view of an electrical outlet box constructed in accordance with the present invention, and illustrating a type of improved connector fitting connected to one side wall thereof.

FIG. 2 is a side elevation view of the electrical connector fitting of the invention as it appears when viewed from the side to which the connector fitting is attached.

FIG. 3 is side elevation view of the electrical outlet box and connector fitting when the combination thereof is viewed with the assembly rotated 90° from the view illustrated in FIG. 2.

FIG. 4 is a rear elevation view of the electrical outlet box as it appears when viewed from the rear, or toward the side which is attachable to a mounting stud.

FIG. 5 is a detail view illustrating the manner in which the connector fitting is snap-engaged with a side wall of the box after a pressure removable plug, constructed in accordance with the present invention, has been removed from the side wall to provide an opening to receive such connector fitting.

FIG. 6 is an enlarged detail view illustrating a fluted screw receiving hole which is formed in a boss forming a part of the electrical outlet box of the invention.

FIG. 7 is a sectional view taken along line 7—7 of FIG. 1.

DETAILED DESCRIPTION OF A PREFERRED EMBODIMENT OF THE INVENTION

Referring initially to FIG. 1 of the drawings, a synthetic resin electrical outlet box constructed in accordance with the invention is illustrated therein, and is denominated generally by reference numeral 10. The outlet box 10 includes a bottom or back wall 12 and four side walls 14, 16, 18 and 20. The side walls 14–20 project normal to the back wall 12 and define a hollow right parallelepiped. Thus, the box has an open face or front side opposite and extending parallel to the back wall 12. When the box is installed, the electrical connections thereto completed, and the box is in service, the open front side is closed by a cover plate (not shown) which is secured to the box. The box is molded from a synthetic resin material, such as polyvinyl chloride.

At one side of the box, in alignment with the side wall 20, a pair of mounting flanges 22 and 24 project from the corners of the box in coplanar alignment with each other. The mounting flanges 22 and 24 are provided with a plurality of holes 25, as illustrated in FIG. 2, to facilitate the passage of screws, nails or other fastening devices through the mounting flanges into a wall stud or the like for securing the electrical outlet box thereto.

At the corner of the box where the side walls 16 and 18 intersect, a molded boss 26 is located and defines a fluted hole 28 which functions to receive a threaded fastening element, such as a screw, used to retain a cover plate on the box. Similarly, a boss 30 is provided at the corner of the box where the side walls 14 and 20 intersect, and this boss defines a fluted screw-receiving hole 32. The fluted screw-receiving holes 28 and 32 are identically constructed, and each includes a plurality of radially inwardly extending flutes 35 as illustrated in FIG. 6. The flutes 35 function to engage the threads of a screw threaded into these holes to thereby afford firm retention of the cover plate on the box.

In the illustrated embodiment of the electrical outlet box, each of the side walls 14, 16, and 18 have pressure removable plugs formed therein. (One of the pressure removable plugs has been pressed out of the wall 18 and is shown replaced by a connector fitting hereinafter described.) Thus, the side wall 14 includes a pair of horizontally spaced, pressure removable plugs 34 and 36. Similarly, the side wall 16 has formed therein a pair of pressure removable plugs 38 and 40, and the side wall 18 carries a pressure removable plug 42.

In the manufacture of the electrical outlet box 10, the box is molded from a selected synthetic resin, a preferred material of construction being polyvinyl chloride. After typically molding the box in parallelepiped configuration, the pressure removable plugs are formed by a stamping or die punch operation in which a carefully controlled die punch is pressed against the side wall of the box at the location where the pressure removable plug is to be formed. The die punch carries a sharp edge, and is controlled to reciprocate just sufficiently far to press the pressure removable plug out of the plane of the side wall of the box so that it is retained connected to the side wall by material which is only from about 5.0 percent to about 10.0 percent of the thickness of the side wall. From 85/100 to 95/100 of the side wall (in terms of its thickness) is pressed completely out of the plane of the side wall, and protrudes internally into the interior of the box. This operation assures that a cleanly formed cylindrical cavity, with no ragged edges or sprue, is formed where the pressure removable plug has been displaced out of the side wall, as is illustrated in FIG. 7 of the drawings. Moreover, no breaks or openings are thereby formed through the wall of the box, and the water tight integrity of the box is maintained. Typically, a side wall of an electrical outlet box constructed in accordance with the present invention, and from polyvinyl chloride, will have a wall thickness of from about 0.05 inch to about 0.25 inch. A thickness of from about 0.09 inch to about 0.11 inch is preferred.

At two points spaced by from about 60° to about 80° of arc from each other around the periphery of the pressure removable plug, a pair of very slightly thickened retention points 46 and 48 are provided where slightly thicker tabs of plastic join the displaced disc-shaped plug to the surrounding portion of the side wall of the box which defines the boundary adjacent the cylindrical cavity left by displacement of the plug.

A novel connector fitting designated generally by reference numeral 50 is illustrated attached to the side wall 18 of the box at a location where one of the pressure removable plugs has been removed to provide an opening through the side of the box. Prior to describing the method by which the connector fitting 50 is employed to remove the pressure removable plug, and by which the fitting is then attached to the side wall 18 of the box, the connector fitting 50 will be described. Other, less preferred, types of connector fittings can also be less advantageously employed with the box.

As best illustrated in FIGS. 1, 2 and 5, the connector fitting 50 is a generally cylindrical two part structure which includes a pair of complementary or mating semi-cylindrical parts or jaws 52 and 54 which are, in the illustrated embodiment, interconnected by a plastic loop or U-shaped hinge 56. The resilient properties of the loop 56 function to retain the jaws or semi-cylindrical parts 52 and 54 spaced from each other along a diametric plane when the fitting 50 is not in a constricted or converged condition by reason of insertion in a receiving opening.

Each of the semi-cylindrical parts 52 and 54 of the connector fitting 50 includes a wedge-shaped end portion designated generally by reference numeral 58. Each wedge-shaped end portion 58 includes a pair of deformable wedge quadrants 60 and 62 formed on an arc of a circle and subtending an angle of about 70°. The two wedge quadrants 60 and 62 are separated from each other by a space 64 as shown in FIG. 5, which space includes a pair of parallel side edges extending from the free end of the wedge-shaped end portion end of the connector fitting 50 and terminating axially inwardly in an oval-shaped enlargement 74. Each of the wedge quadrants 60 and 62 includes a beveled radially outer side 76 which slopes axially forwardly and radially inwardly and terminates at a lip 78 which has a radiused inner side 79.

At the opposite end of the connector fitting 50 from the wedge-shaped end portions 58, each of the portions 52 and 54 of the fitting includes a semi-cylindrical body portion. The two thus positioned semi-cylindrical body portions 80 and 82 together form a cylindrical body portion as they are held in a symmetrical, complementary relationship to each other by the interconnecting loop 56.

At the intersection of each of the semi-cylindrical body portions 80 and 82 with the wedge-shaped end portions 58 carried on the respective semi-cylindrical part 52 or 54, an external, annular radially inwardly extending groove 84 is formed around the connector fitting as illustrated in FIG. 5.

The pressure removable plugs 34–42 can be easily removed by pressing the point of a screw driver or the like against the plugs to pop them out of their respective side walls, and such is the preferred method of plug removal. The type of connector fitting herein described may, however, be quickly and easily installed without the requirement that any hand tools be utilized. In such installation of the connector fitting in an electrical outlet box, the cylindrical body portion of the fitting 50 formed by the two semi-cylindrical body portions 80 and 82 are gripped between the thumb and fingers of the installer, and the wedge-shaped end portions are placed in flatly abutting contact with one of the pressure removable plugs. The fingers are then used to exert an inward pressure, through the fitting 50, against the pressure removable plug, and the pressure applied is developed over the relatively small area constituted by the four wedge quadrants carried on the semi-cylindrical parts 52 and 54.

Thus, a relatively large pressure is brought to bear over a small, annular pressure zone which is located immediately radially inwardly of the circular zone of weakness where the pressure removable plug is connected to the respective side wall of the electrical outlet box. This arrangement thus permits a relatively slight manual pressure to be sufficient to pop the pressure removable plug out of the side wall. Preferably, the plug can be removed by an applied force of as low as 10 pounds. The method by which this plug has been formed in the fabrication of the box assures that a smooth walled, precisely symmetrical circular opening will be developed when the pressure removable plug is thus removed from the box wall.

Continued inward pressure exerted manually upon the connector fitting 50 will cause the wedge-shaped end portions of the fitting to be pressed through the opening left in the wall of the box and into the position illustrated in FIG. 5 of the drawings. In this position, the edge of the wall of the box which surrounds and defines the opening in the box wall passes into, and registers with, the annular groove 84 formed around the outside of the connector fitting, as shown in FIG. 5. Further, since the pairs of quadrants 60 and 62 have been flexed or deformed radially inwardly as the connector fitting is pressed through the opening in the wall of the box, and since the two semi-cylindrical parts 52 and 54 have been pressed towards each other into a convergent location (as compared to their spaced location developed by the resilient character of the loop 56 when the fitting is in its relaxed status), the fitting will then snap outwardly so that it fits tightly and snugly within the opening, and firmly engages the defining boundary of the wall in which the receiving opening has thus been formed.

The particular type of connector fitting which is here illustrated as one which is useful in a preferred embodiment of the invention is one which is adapted for connecting a corrugated conduit or tubular raceway to the electrical outlet box where such conduit or raceway is to be employed for containing electrical leads extending into the box. To this end, semi-circular ribs 86 and 88 are formed on the radially inner side of the two semi-cylindrical parts 52 and 54 of the connector fitting, and are in axial alignment across the semi-cylindrical parts so that they can register with and engage the corrugations of a corrugated conduit placed within the semi-cylindrical parts prior to the time that the connector fitting is pressed against the removable plug, and snapped into the opening in the box wall when the plug is removed.

Although a preferred embodiment of the invention has been herein described in order to illustrate the principles of the invention, various changes and innovations can be made in the illustrated and described embodiment without departure from such principles. For example, other types of boxes or fittings of synthetic resin construction, differing in geometry from that which is illustrated, can be provided with the pressure removable plugs of the invention. Moreover, other types of connector fittings can also be connected to the side walls of such boxes at the openings provided by removal of the pressure removable plugs. Changes and innovations of this type are therefore deemed to be circumscribed by the spirit and scope of the invention except as the same may be necessarily limited by the appended claims or reasonable equivalents thereof.

What is claimed is:

1. In combination, a hollow, synthetic resin electrical box, and a connector fitting for joining a tubular conduit to the box, comprising:

a back wall;

at least one side wall extending substantially normal to the back wall and forming with the back wall, a hollow, open sided enclosure;

a round hole in one of said side walls, said hole having a cylindrical, smooth-walled boundary, with said one side wall adjacent and surrounding said hole having a thickness of from about 0.05 inch to about 0.25 inch;

a smooth-walled, cylindrical indentation in one of said side walls;

a cylindrical plug closing the bottom of said indentation, said plug projecting from the plane of the lastmentioned side wall into the interior of the box; and a connector fitting extending into and through the hole and engaging the side wall of the box, said connector fitting including a pair of semi-cylindrical halves, each of said semi-cylindrical halves including:

a semi-cylindrical body portion located outside said box and having a larger diametric dimension than said hole, and having an axial length facilitating gripping said pair of body portions with the fingers and thumb extended around the outer side thereof whereby the connector fitting may be utilized to manually force a knockout plug out of said side wall to leave said round hole as said connector fitting is extended into and through the hole and attached to said side wall; and at least two wedge-shaped end portions connected to each of said semi-cylindrical body portions, each of said wedge-shaped end portions being formed on a sector of a cylinder, and each of said wedge-shaped end portions being located inside said box and including a beveled radially outer surface which slopes axially toward the inside of said box, and also slopes radially inwardly; and a semi-cylindrical lip at the axial end of said beveled radially outer surface farthest inside said box, said semi-cylindrical lip having an outer, semi-cylindrical surface formed on a uniform diameter, and said semi-cylindrical lip having a radiused inner side at its free, axially inner end farthest inside said box, whereby a conductor bearing against and contacting said radiused inner side at the free, axially inner end of said cylindrical lip will not be cut or unduly chafed by said contact with said inner side, and whereby said wedge-shaped end portions collectively form a generally cylindrical punch member by which a substantial axial force imposed upon said connector fitting and acting through said semi-cylindrical halves in the direction of said wedge-shaped end portions can be brought to bear on the semi-cylindrical lips at the axially inner end of the beveled radially outer surface of said wedge-shaped end portions to thereby facilitate forcing a plug out of said round hole at the time said connector fitting is extended into and through the hole for attachment to said side wall;

said connector fitting further having an annular external groove therearound at the intersection of said body portions with said wedge-shaped end portions, said groove receiving said cylindrical, smooth-walled boundary of said hole therein after said connector fitting has been used to press one of said plugs out of said hole; and a flexible loop interconnecting said semi-cylindrical body portions to hold said semi-cylindrical body portions in a symmetrical, complementary relationship to each other prior to insertion thereof into said round hole.

2. The method of manufacturing a hollow, synthetic resin electrical outlet box having at least one closed, pressure removable window in a side wall thereof, and having at least one synthetic resin connector fitting for joining a tubular conduit to the box extending through an open window in a side wall thereof, comprising:

molding synthetic resin into the shape of said box to provide a back wall, and one or more side walls defining, with the back wall, a hollow interior, and an open front opposite the back wall, said side walls having a thickness of from about 0.05 inch to about 0.25 inch; then stamping at least one side wall with a cylindrical male punch moved against each such one side wall in a direction normal to the side wall, and against the outer surface thereof to indent the respective side wall and force a cylindrical plug out of the inner surface of such side wall without effecting total separation of the plug from the side wall at any point around the plug, and so that the plug pressed out of the side wall forms the bottom of a smooth-walled, cylindrical indentation, each said cylindrical plug protruding out of the plane of the side wall from which it is forced and into the interior of the box by a distance, measured normal to the wall from which it is forced, which is from about 85/100 to about 95/100 of the side wall thickness, and each of said plugs having a zone of weakness surrounding the respective plug and joining the respective plug to said one side wall;

molding a synthetic resin connector fitting which includes a pair of flexibly interconnected semi-cylindrical halves, each of said semi-cylindrical halves including:
- a semi-cylindrical body portion having a larger diametric dimension than said hole, and having an axial length facilitating gripping said pair of body portions with the thumb and fingers to thereby enable manual insertion of said connector fitting into an opening in said side wall by forcing one of said plugs out of said opening; and
- a plurality of wedge-shaped end portions connected to each of said semi-cylindrical body portions and defining therewith, a portion of an annular external groove extending around said fitting, each of said wedge-shaped end portions being formed on an arc of a circle, and being arcuate in transverse cross-sectional configuration, and each of said wedgeshaped end portions including:
  - a beveled, radially outer side which slopes axially and radially inwardly; and
  - a lip at the end of said beveled side farthest from the location where said wedge-shaped end portion is connected to its respective associated semi-cylindrical body portion, said lip having an outer surface of frusto-cylindrical configuration formed on a uniform diameter, and said lip having a radiused inner side at its free end; then manually removing one of said plugs and concurrently engaging said connector fitting with said box by,
- gripping said semi-cylindrical body portions between the thumb and fingers; and
- placing said lips carried on said wedge-shaped end portions inside one of the indentations formed in said side wall by said cylindrical male punch, and against the plug closing said indentation along a pressure zone immediately radially inwardly from said zone of weakness; and manually applying an axial force to force said one plug out of said indentation to open a hole through said one side wall, and to force said connector fitting to a position where said side wall enters said annular external groove extending around said connector fitting at the intersection of said body portions with said wedge-shaped end portions, said groove receiving the cylindrical smooth-walled boundary of said hole therein.

* * * * *